Dec. 28, 1954

M. J. BOZICH 2,698,362

BIN LEVEL INDICATOR

Filed Feb. 23, 1952

INVENTOR.
MICHAEL J. BOZICH.

BY
Brown, Critchlow, Flick & Peckham
his ATTORNEYS

United States Patent Office 2,698,362
Patented Dec. 28, 1954

2,698,362
BIN LEVEL INDICATOR
Michael Joseph Bozich, Pittsburgh, Pa.

Application February 23, 1952, Serial No. 273,089

2 Claims. (Cl. 200—61.21)

This invention relates to apparatus for indicating a predetermined level of dry bulk material such as flour, cotton, grains, ores, coal and the like, in a bin or an equivalent container into which such material is fed, so that the feeding of it may be stopped or otherwise controlled.

An example of the use of a bin level indicator such as here contemplated is disclosed in my Patent No. 2,565,946 which discloses a hopper or bin to the upper portion of which material in discrete form is supplied, and from the lower end of which it is discharged into a pneumatic conveying conduit which is supplied with air under pressure. For reasons explained in that patent, it is desirable that the operation of the mechanism be altered when the material supplied to the hopper rises above a predetermined level, and for such control there is provided a swinging lever which actuates an electric switch in a control circuit. As stated, that is one example of the use of a bin level indicator; but it should be understood that there are numerous other uses of it in different environments.

The object of this invention is to provide a bin level indicator which is simple, effective and positive in its action, and which, due to its simplicity, is economical to manufacture, the indicator being provided with instrumentalities for showing when bin material reaches a certain level and, in its preferred form, for controlling mechanism that is associated with the supply of material to a bin and its discharge from it.

Figure 1:
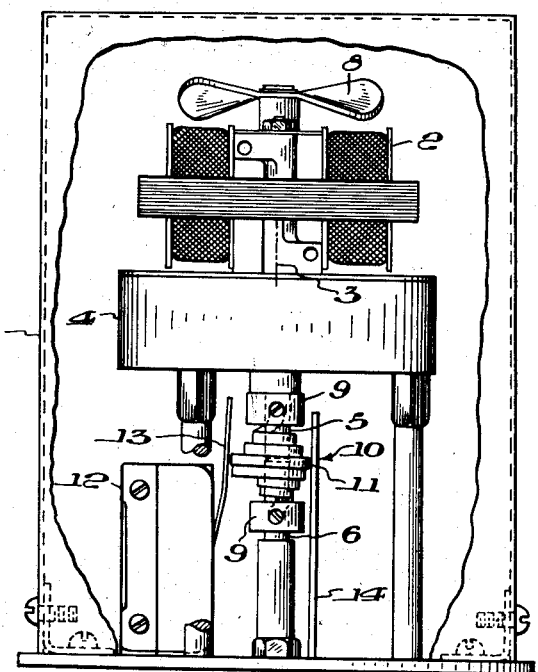
Figure 4:
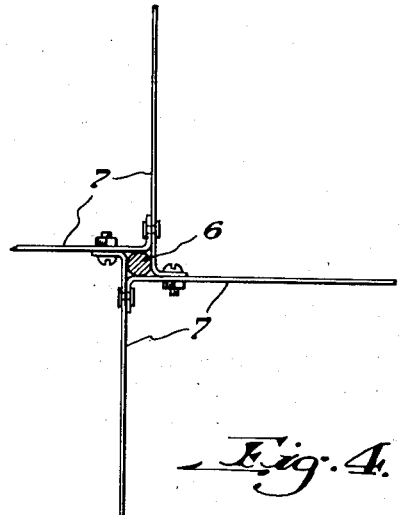
Figure 2:
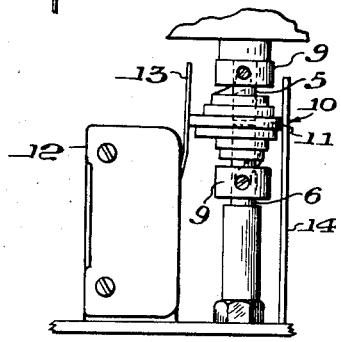
Figure 3:
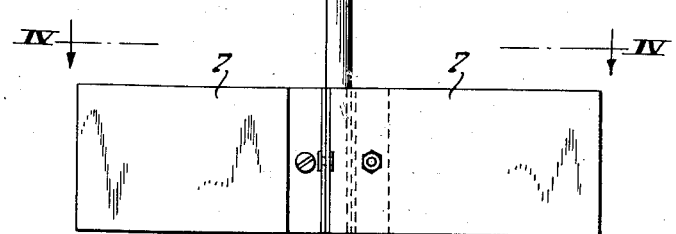
Figure 3:
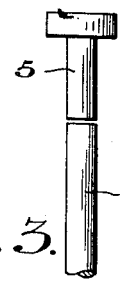
Figure 5:
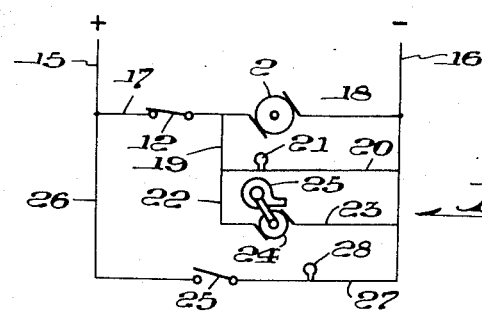

The invention is illustrated in the accompanying drawing of which Fig. 1 is an elevation of the preferred form of indicator mounted in a casing, a portion of the casing being broken away to show the construction of the indicator; Fig. 2 an elevation of a torsion-spring-drive shaft and associated parts, shown, in an alternate position to that illustrated in Fig. 1; Fig. 3 an elevation of a divided driving shaft which forms part of the indicator mechanism; Fig. 4 is a plan-view of a paddle at the lower end of the drive shaft, the plane of view being indicated by the line IV—IV, Fig. 1; and Fig. 5 is a wiring diagram of electric circuits that are or may be controlled by the indicator.

The bin level indicator provided according to this invention includes a casing having a motor, including a rotor, mounted in its upper portion. Extending downward from the motor, there is a divided shaft having an upper driving section that is connected to the rotor of the motor, and also a lower driven section in alignment with the driving section. The driven section extends below the casing and is provided at its lower end with a paddle which is positioned at such height in a bin, or an equivalent container, that when material supplied to the bin rises to the level of the paddle, the engagement of the paddle by the material will stop its rotation. The aligned driving and driven shafts are connected to each other by a torsion coil drive spring which, when rotation of the paddle is stopped in the manner just explained, cases the spring to vary in diameter, either by enlargement or contraction of its diameter.

Adjacent to the torsion drive spring, there is an electric switch for controlling a motor circuit as well as an indicator circuit, and for such additional purposes as may be desired, as will presently be explained. The switch has a controller that is adapted to be moved in response to the above-explained variation in the diameter of the torsion drive spring. When so moved, the switch opens the circuit through the shaft-driving motor, and also controls a circuit through an indicator constructed to visually or audibly indicate that bin material has risen to the level of the paddle and stopped it. The switch may also control mechanism, such as the motor of a blower, in the instrumentalities for supplying material to the bin.

Having reference now to the illustrative embodiment of the invention, the bin level indicator comprises a casing 1 which may be mounted in a bin at any desired height. Within the upper portion of the casing there is a motor 2 having a vertically extending rotor whose axis is indicated by the dot-and-dash line 3. The motor is preferably of quite low power, for example, $\frac{1}{200}$ H. P., and its rotor is connected to a speed-reducing gear mounted in a housing 4, which in turn is connected to a driving shaft 5, the arrangement being such that the driving shaft is rotated at a very low rate of speed, as for example, five revolutions per minute. In vertical alignment with driving shaft 5 there is a driven shaft 6 which extends through the bottom of casing 1, and to the lower end of which there is attached a paddle 7 having radially extending vanes as shown in Fig. 4. The upper end of the motor rotor may be provided with an impeller 8 for circulating air through and around the motor for cooling it.

As has been stated, the apparatus may be so positioned in a bin that the paddle lies at a predetermined level of bin material so that the paddle will be engaged by such material when its level rises to that of the paddle. Alternatively, the position of the paddle may be determined by the length of driven shaft 6, which may be varied as desired.

The adjacent ends of driving shaft 5 and driven shaft 6 are connected to each other by a torsion coil spring 10, and for this purpose these shafts are equipped with spring engaging collars 9, as shown in Fig. 3. The ends of the spring are clamped between the collars and shafts by set screws in the collars. The attachment of the upper end of the spring to driving shaft 5 is such that the rotation of the shaft places a thrust on the spring which, through the several convolutions of the spring, rotates driven shaft 6 and the paddle 7 attached to it. As shown, the spring preferably has a relatively large diameter convolution 11 at its center, and the convolutions above and below it are of gradually smaller diameters. The normal shape of the spring and relative diameters of its convolutions when the motor is running to drive paddle 7 are as shown in Fig. 1.

Adjacent to spring 10 there is an electric switch 12 that is provided with a laterally movable switch controller 13 adjacent to the spring. In a manner presently to be explained, switch 10 constitutes an element of an electric circuit through motor 2, and through an indicator, and con- troller 13 is preferably yieldingly urged outwardly to circuit-closing position. When the rotation of paddle 7 is stopped by bin material which engages the paddle as the level of the material rises to that of the paddle, the continued rotation of driving shaft 5 causes the convolutions of spring 10 to expand in diameter, and in doing so spring convolution 11 engages switch controller 13 to move the switch to open-circuit position, and thus stop the rotation of driving shaft 5 and actuate a suitable indicator. To force the spring to expand to the left, as seen in Figs. 1 and 2, a spring-expansion circuit plate 14 is positioned at the right of the spring, preferably with a slight clearance between it and convolution 11 when the paddle is being driven normally.

The torque of the expanded spring is insufficient to rotate driving shaft 5 in a reverse direction, in view of which the expanded spring, and particularly convolution 11, so holds the controller 13 that the motor and indicator circuits remain open until the level of bin material falls below paddle 7. When this occurs, convolution 11 assumes its normal shaft-driving position, and as a consequence thereof, controller 13 automatically closes the motor circuit.

The alternate circuit-controlling position of controller 13 effected by the expansion of spring convolution 11 is illustrated in Fig. 4. As there shown, convolution 11 is expanded to a larger diameter than shown in Fig. 1, and is in contact with controller 13. In Fig. 1, there is a small space between convolution 11 and controller 13, but this is unnecessary. Simultaneously with the opening of the motor circuit, electrical connections are provided for visually or audibly indicating, outside of the bin, that the level of the bin material has so risen as to stop paddle 7. The preferred arrangement for this is illustrated in the wiring diagram shown in Fig. 5, which shows electric supply lines 15 and 16 extending adjacent to switch 12 to motor 2, such lines being controlled by a manually operable switch that is not shown. Switch 12 is shown in its normal circuit-closing position illustrated in Fig. 1, the motor circuit including a conductor 17 connected to supply line 15, and a conductor 18 connected to supply line 16. In parallel with the circuit through motor 2, there is a circuit formed by conductors 19 and 20 which passes through a suitable indicator to show that the motor is running. This indicator may be a green light 21 which remains lit as long as motor 2 is being driven. The parallel circuit may also include a motor for a blower, such as disclosed in my above-mentioned Patent No. 2,565,946, but, if it is desired to so control a motor for a blower or for another instrumentality in association with the bin, it is preferred to provide a special parallel circuit having conductors 22 and 23. They are shown as passing through a motor 24 for actuating a blower 25.

Indicator 21, which is in a circuit formed by conductors 19 and 20, may be used as the sole visual indication of the fact that motor 2 is being driven, and has not been stopped by the rise of material in the bin to a predetermined level, the indication being a light that is lit when the motor is running, and which is turned off when the motor stops. However, it is preferred to provide a special indication for the latter, and to that end the switch structure may be a double switch which is actuated by controller 13. The second switch indicated at 25 in Fig. 5 is in a circuit formed by conductors 26 and 27 that are connected to supply lines 15 and 16. As indicated, this circuit is opened by switch 25 during the time that motor 2 is rotating, but when closed by the actuation of controller 13, it may illuminate an indicator in the form of a red lamp 28.

In the foregoing description of the invention, the operation of the several elements of the apparatus has been explained. In the operation of the apparatus as a whole, the indicator is so positioned in a bin that paddle 7 is located at a predetermined top level of material supplied to a bin. During such time as current flows through supply conductors 15 and 16, motor 2 is driven continuously until the level of material in the bin rises to that of paddle 7 and stops its rotation. The continued driving of the motor causes driving shaft 5 to rotate, and in doing so it expands the convolutions of torsion spring 10, and particularly convolution 11. The expansion of that convolution moves switch controller 13 to the left, or in other words to the position shown in Fig. 4 in which circuit 17, 18 through motor 2 is opened to stop the motor. This opening of switch 12 also opens a parallel circuit 19, 20 through a green light or equivalent indicator 21, which shows that the bin material has reached the predetermined level for which it is positioned. A similar circuit 22, 23, also in parallel with motor circuit 17, 18, is opened by this movement of switch 12 to open a circuit through a motor 24 of blower 25 or of an equivalent instrumentality used in association with the bin. Switch structure 12 also includes another switch 25 which controls a further circuit 26, 27 to close it and thereby actuate an indicator 28 which may be a red light. When the level of the material in the bin falls below that of paddle 7, the convolutions of spring 10 assume their normal contracted position shown in Fig. 1 so that switch controller 13 closes the circuit through motor 2 and opens the circuit through indicator 28.

According to the provisions of the patent statutes, I have explained the principle and mode of operation of my invention and have illustrated what I now consider to be the best embodiment of it. However, I desire to have it understood that, within the scope of the appended claims, my invention may be practiced otherwise than as illustrated and described.

I claim:

1. In a bin level indicator having an electric motor for rotating a paddle whose rotation is adapted to be stopped when the paddle is engaged by material in a bin, the combination of a divided motor shaft having a driving section adapted to be driven by a motor and a driven section in axial end-to-end alignment with the driving section and adapted to be connected to a paddle, an elongated helical torsion coil drive spring connected at its opposite ends to said driving and driven shaft sections, a motor-controlling switch having a movable controller adjacent to convolutions of said spring, said spring being formed for variations in diameter by continued rotation of said driving shaft when rotation of said driven shaft is stopped, and said spring by such variations in its diameter being effective to move said switch controller.

2. In a bin level indicator, the combination of a divided motor shaft having a driving section adapted to be driven by a motor and a driven section in axial end-to-end alignment with the driving section and adapted to be connected to a paddle, an elongated helical torsion coil drive spring connected at its opposite ends to said driving and driven shaft sections, a motor-controlling switch having a movable controller adjacent to convolutions of said spring, said spring being formed for variations in diameter by continued rotation of said driving shaft when rotation of said driven shaft is stopped, and said spring by such variations in its diameter being effective to move said switch controller.

References Cited in the file of this patent

UNITED STATES PATENTS

| Number | Name | Date |
|---|---|---|
| 984,008 | Kallenbach | Feb. 14, 1911 |
| 1,012,010 | Powers | Dec. 19, 1911 |
| 2,116,075 | Lenhart | May 3, 1938 |